United States Patent
Ryu et al.

(10) Patent No.: US 10,420,029 B2
(45) Date of Patent: Sep. 17, 2019

(54) METHOD FOR TRANSMITTING DOWNLINK DATA IN A WIRELESS COMMUNICATION SYSTEM, AND DEVICE FOR SAME

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 15/503,280

(22) PCT Filed: Aug. 11, 2015

(86) PCT No.: PCT/KR2015/008394
§ 371 (c)(1),
(2) Date: Feb. 10, 2017

(87) PCT Pub. No.: WO2016/024790
PCT Pub. Date: Feb. 18, 2016

(65) Prior Publication Data
US 2018/0242246 A1    Aug. 23, 2018

Related U.S. Application Data

(60) Provisional application No. 62/035,516, filed on Aug. 11, 2014, provisional application No. 62/077,924, filed on Nov. 11, 2014.

(51) Int. Cl.
*H04W 52/02*    (2009.01)
*H04W 76/10*    (2018.01)
(Continued)

(52) U.S. Cl.
CPC ......... *H04W 52/0225* (2013.01); *H04W 8/02* (2013.01); *H04W 28/14* (2013.01);
(Continued)

(58) Field of Classification Search
CPC ............. H04W 52/0225; H04W 76/10; H04W 52/0212; H04W 52/0216; H04W 52/0222;
(Continued)

(56) References Cited

U.S. PATENT DOCUMENTS

2011/0310804 A1    12/2011  Beygzadeh
2012/0252481 A1    10/2012  Anpat et al.
(Continued)

FOREIGN PATENT DOCUMENTS

KR    10-2013-0090831 A    8/2013
WO    WO 2013/119021 A1    8/2013
(Continued)

*Primary Examiner* — Maharishi V Khirodhar
*Assistant Examiner* — Kenneth P Hunt
(74) *Attorney, Agent, or Firm* — Birch, Stewart, Kolasch & Birch, LLP

(57) ABSTRACT

Disclosed are a method and apparatus for transmitting downlink data in a wireless communication system. More specifically, a method for transmitting downlink data to a user equipment (UE) in a wireless communication system comprises receiving, by a Mobile Management Entity (MME), a Downlink Data Notification message from a Serving Gateway (S-GW); and in case the MME detects that a UE is in a sleep mode, transmitting, by the MME, a response message for indicating buffering of downlink data to the S-GW, wherein the response message includes buffering time of the downlink data, and the buffering time is a time period until the UE is expected to switch from the sleep mode to a reachable state.

4 Claims, 15 Drawing Sheets

(51) Int. Cl.
*H04W 8/02* (2009.01)
*H04W 28/14* (2009.01)
*H04W 68/02* (2009.01)

(52) U.S. Cl.
CPC ........... *H04W 68/02* (2013.01); *H04W 76/10* (2018.02); *Y02D 70/00* (2018.01); *Y02D 70/10* (2018.01); *Y02D 70/12* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/14* (2018.01); *Y02D 70/142* (2018.01); *Y02D 70/146* (2018.01); *Y02D 70/21* (2018.01); *Y02D 70/24* (2018.01)

(58) Field of Classification Search
CPC ......... H04W 52/0251; H04W 52/0258; H04W 52/0261; H04W 52/0267; H04W 52/0274; H04W 52/0277; H04W 52/028; H04W 52/0209–0296; H04W 52/02–0296
USPC ........................................... 370/311; 455/574
See application file for complete search history.

(56) References Cited

U.S. PATENT DOCUMENTS

| | | |
|---|---|---|
| 2013/0301611 A1 | 11/2013 | Baghel et al. |
| 2013/0343309 A1 | 12/2013 | Mehta |
| 2015/0003312 A1* | 1/2015 | Jeong ................. H04W 52/0235 370/311 |
| 2015/0043449 A1* | 2/2015 | Bangolae .............. H04W 76/14 370/329 |
| 2015/0223196 A1 | 8/2015 | Kim et al. |
| 2016/0021639 A1* | 1/2016 | Ma .................... H04W 52/0216 455/458 |
| 2016/0262041 A1* | 9/2016 | Ronneke ........... H04W 52/0216 |
| 2016/0330686 A1 | 11/2016 | Wu et al. |
| 2017/0064626 A1 | 3/2017 | Jeong et al. |
| 2017/0164286 A1* | 6/2017 | Jeong ...................... H04W 8/02 |
| 2017/0339611 A1* | 11/2017 | Landais ............ H04W 52/0216 |
| 2017/0366423 A1* | 12/2017 | Griot ........................ H04L 67/00 |
| 2017/0374542 A1* | 12/2017 | Ryu ......................... H04W 8/08 |
| 2018/0092154 A1* | 3/2018 | Al .......................... H04W 24/04 |
| 2018/0115923 A1* | 4/2018 | Chandramouli .... H04W 88/182 |

FOREIGN PATENT DOCUMENTS

| | | |
|---|---|---|
| WO | WO 2013/177992 A1 | 12/2013 |
| WO | WO 2014/058242 A1 | 4/2014 |

\* cited by examiner

[FIG. 1]
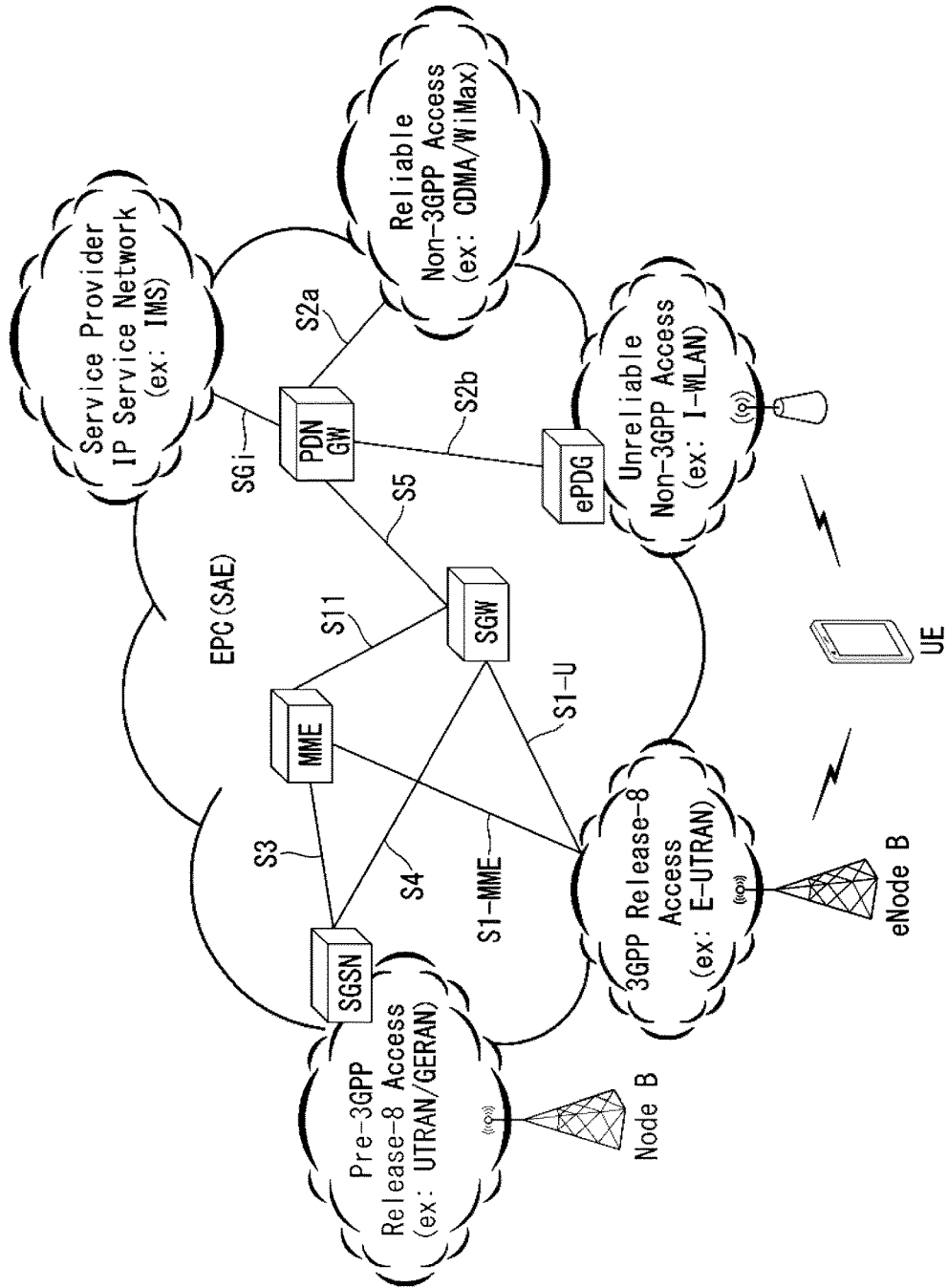

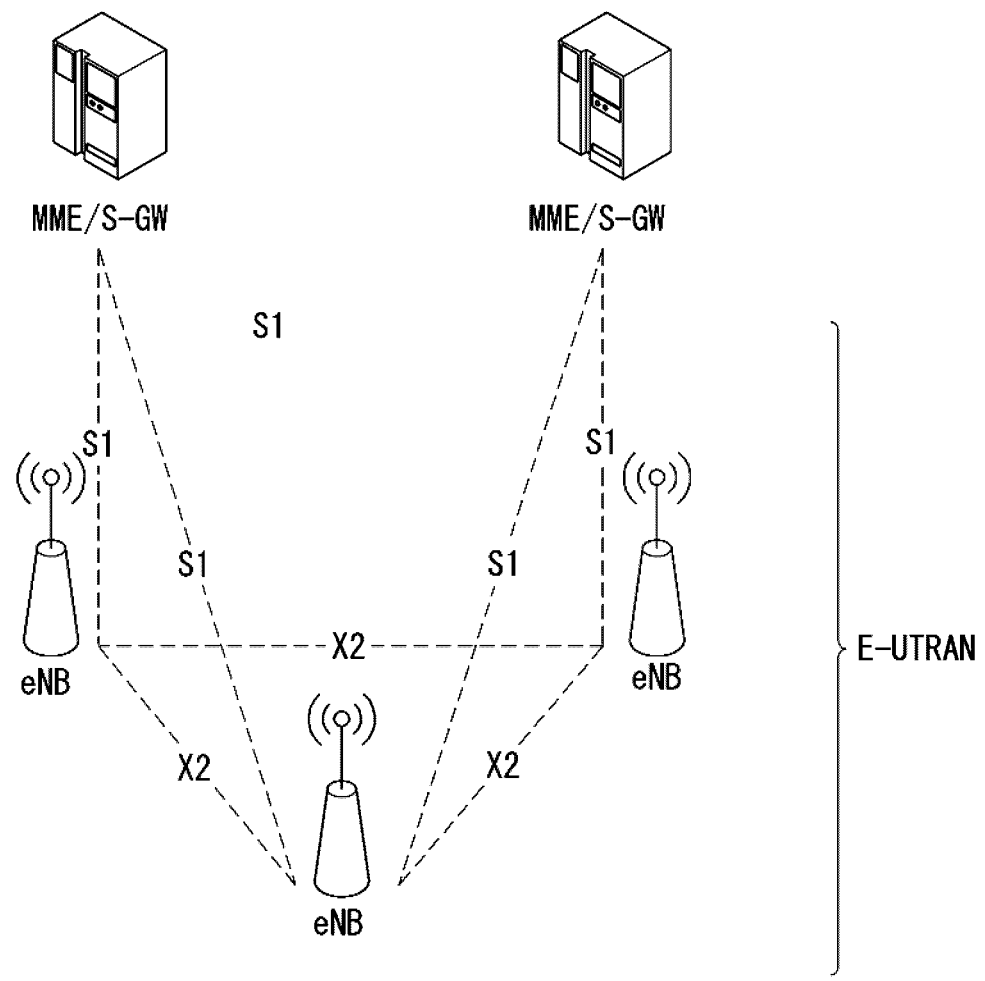
[FIG. 2]

[FIG. 3]
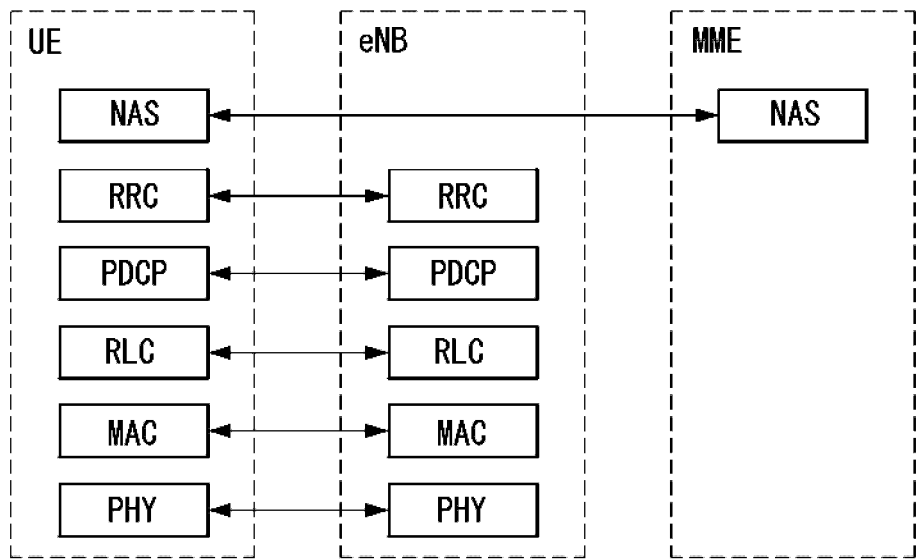
(a) Control Plane Protocol Stack
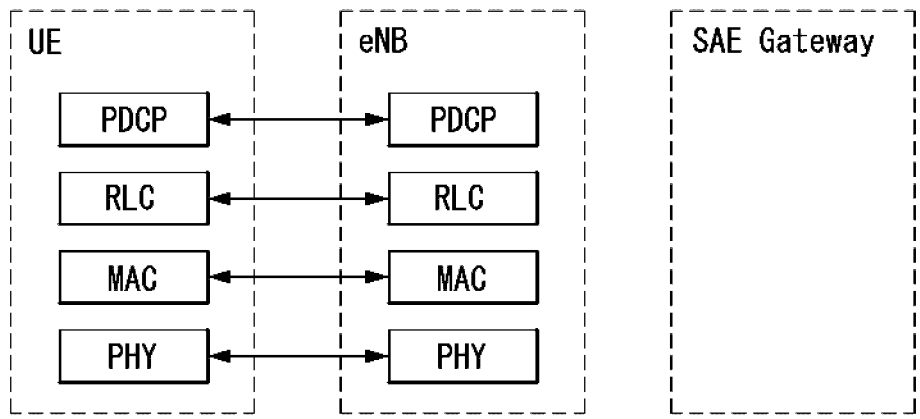
(b) User Plane Protocol Stack

[FIG. 4]
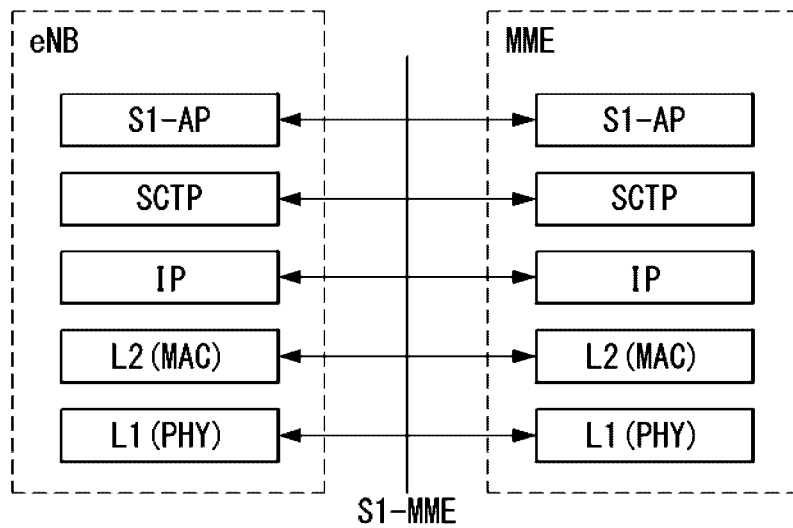
(a) control-plane protocol stack
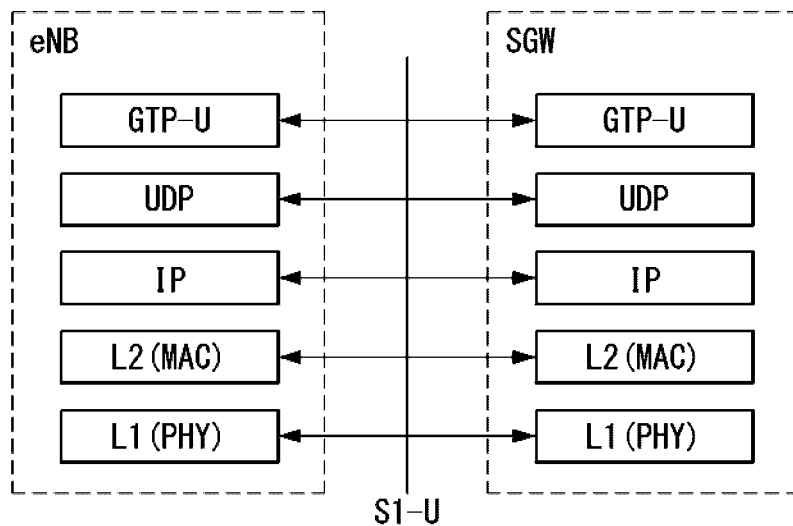
(b) user-plane protocol stack

[FIG. 5]
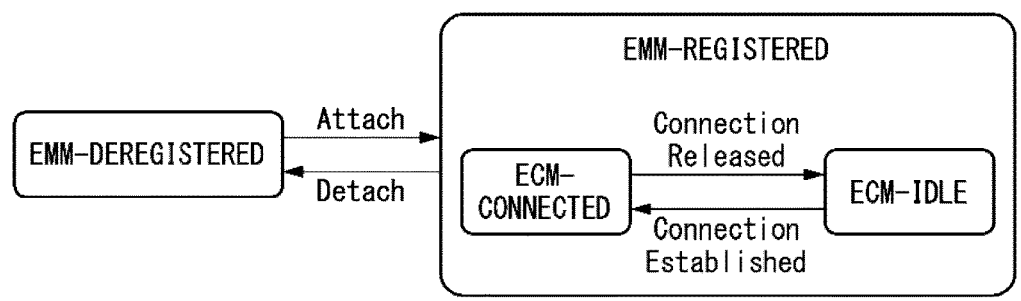
[FIG. 6]
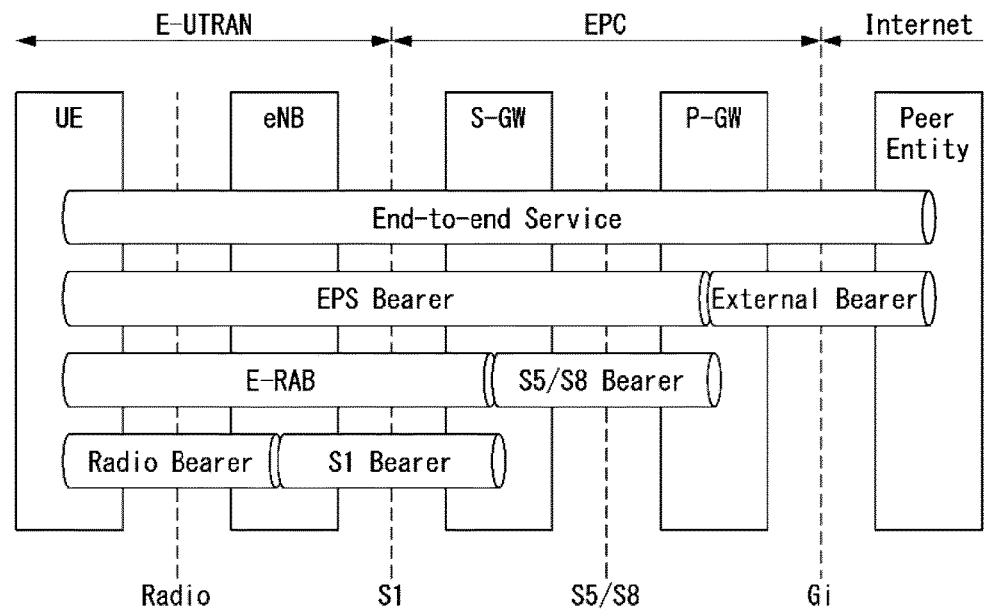

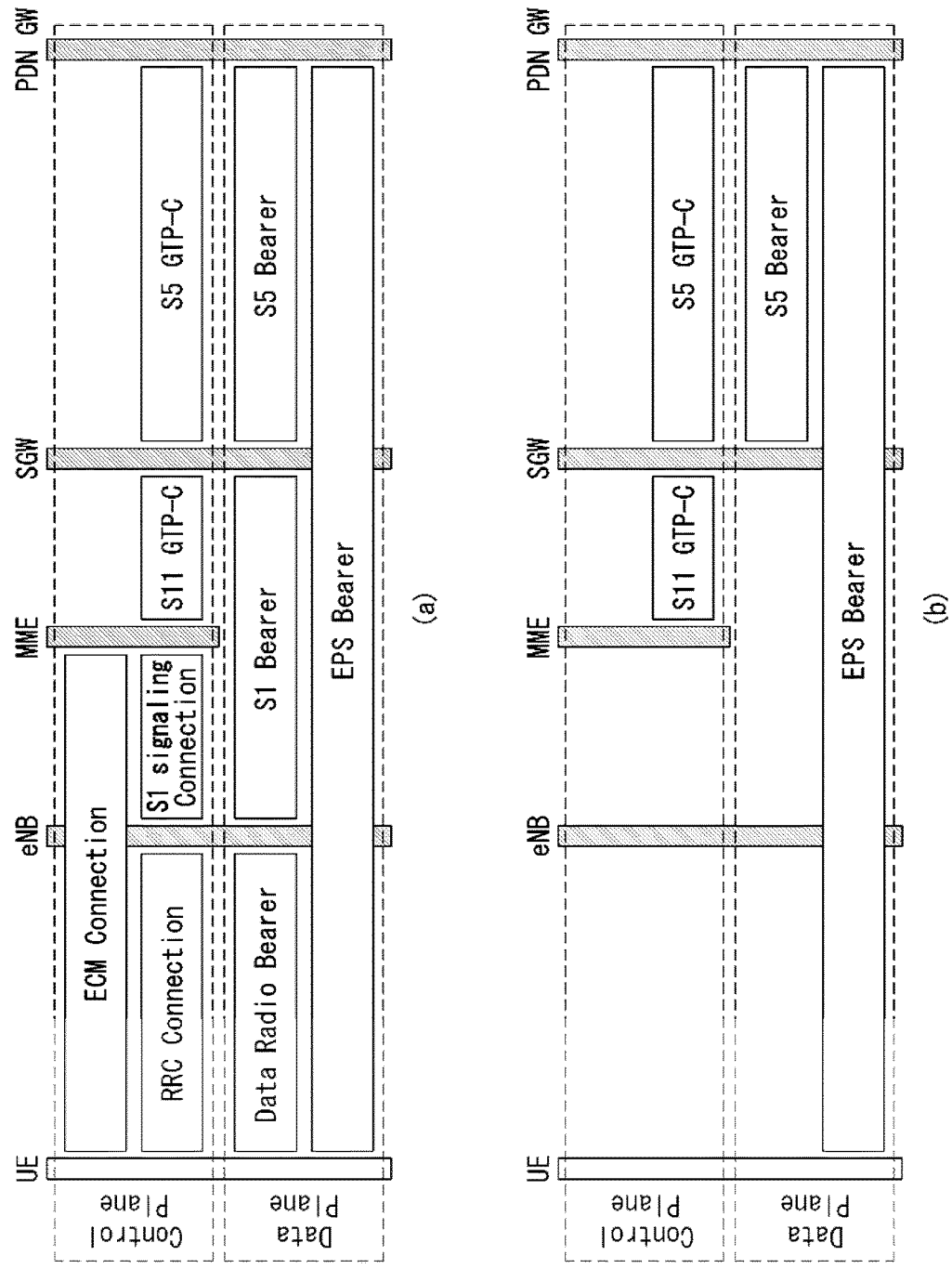
[FIG. 7]

[FIG. 8]
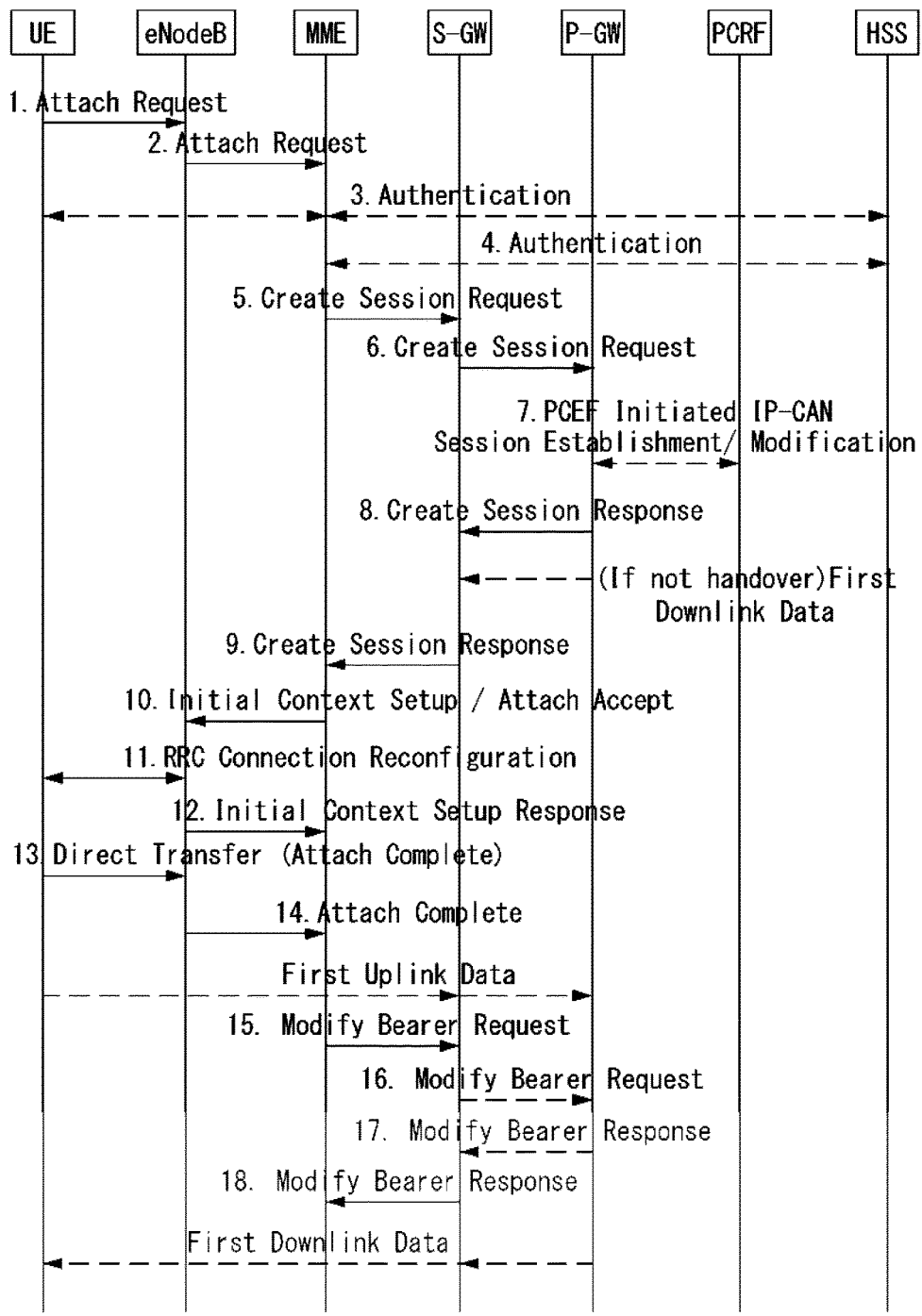

[FIG. 9]
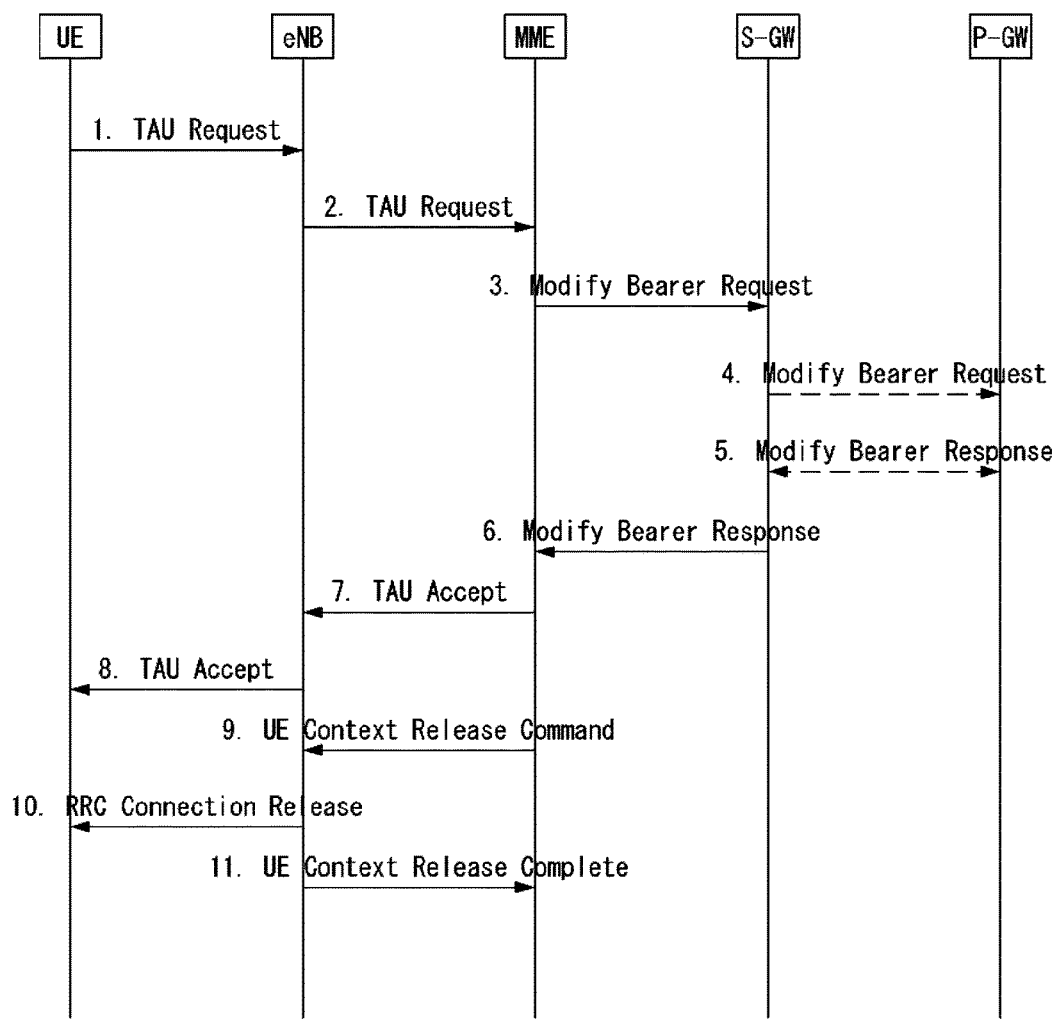

【FIG. 10】
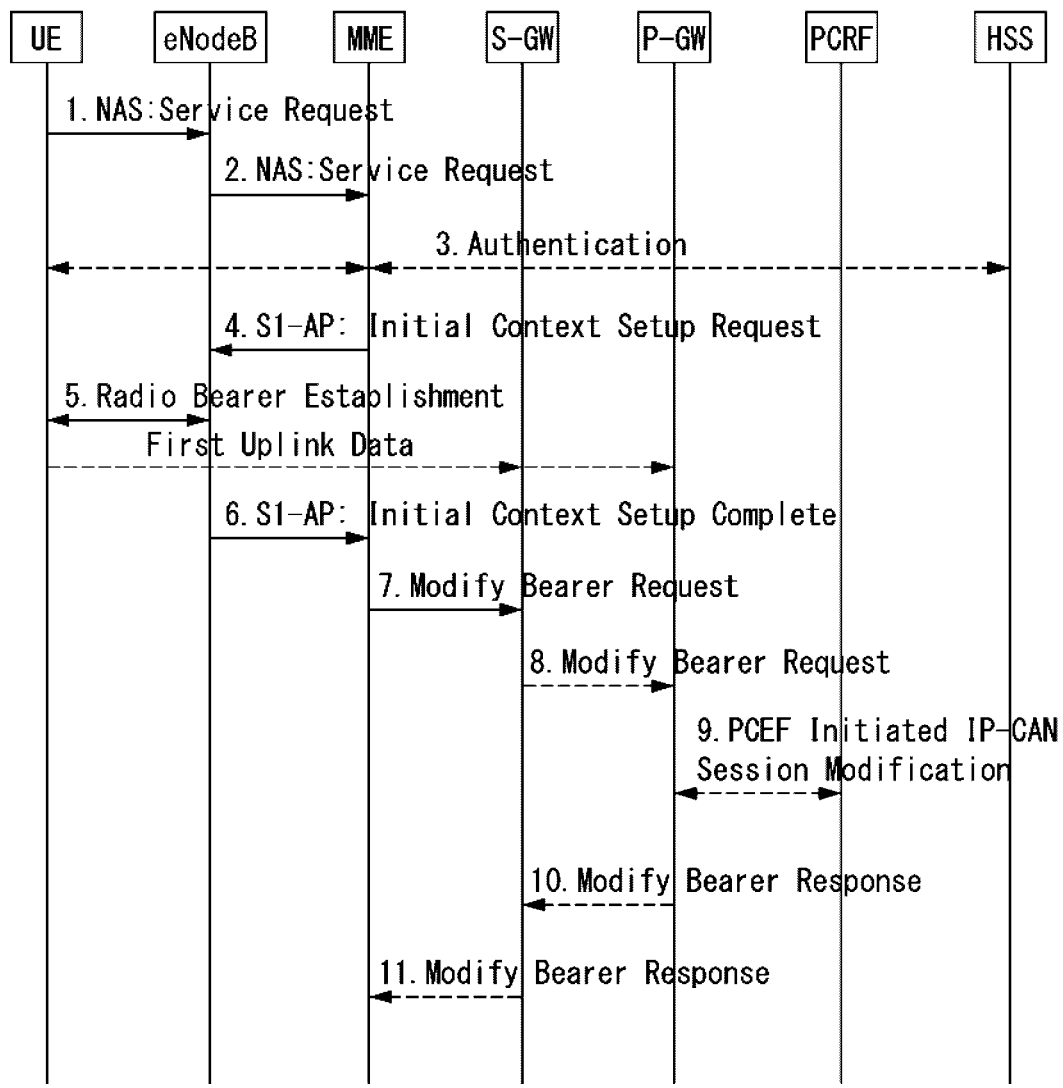

[FIG. 11]
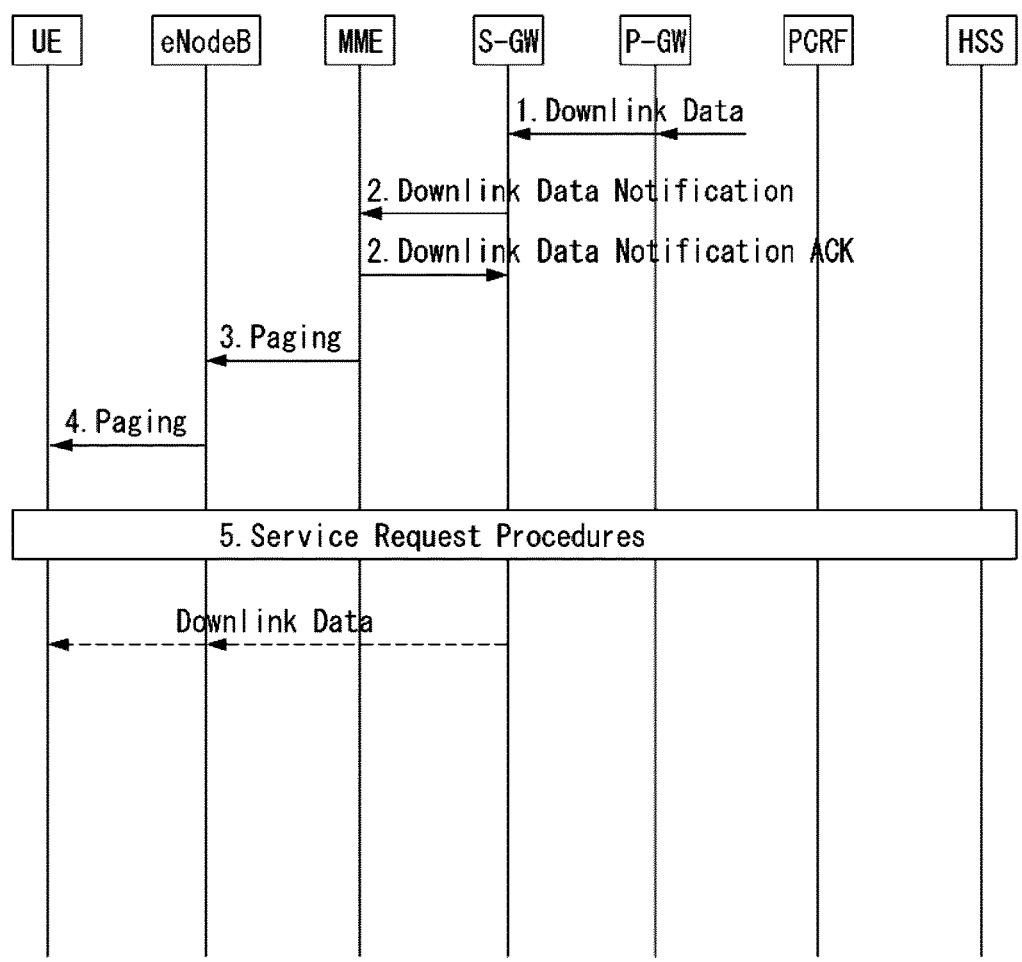

[FIG. 12]
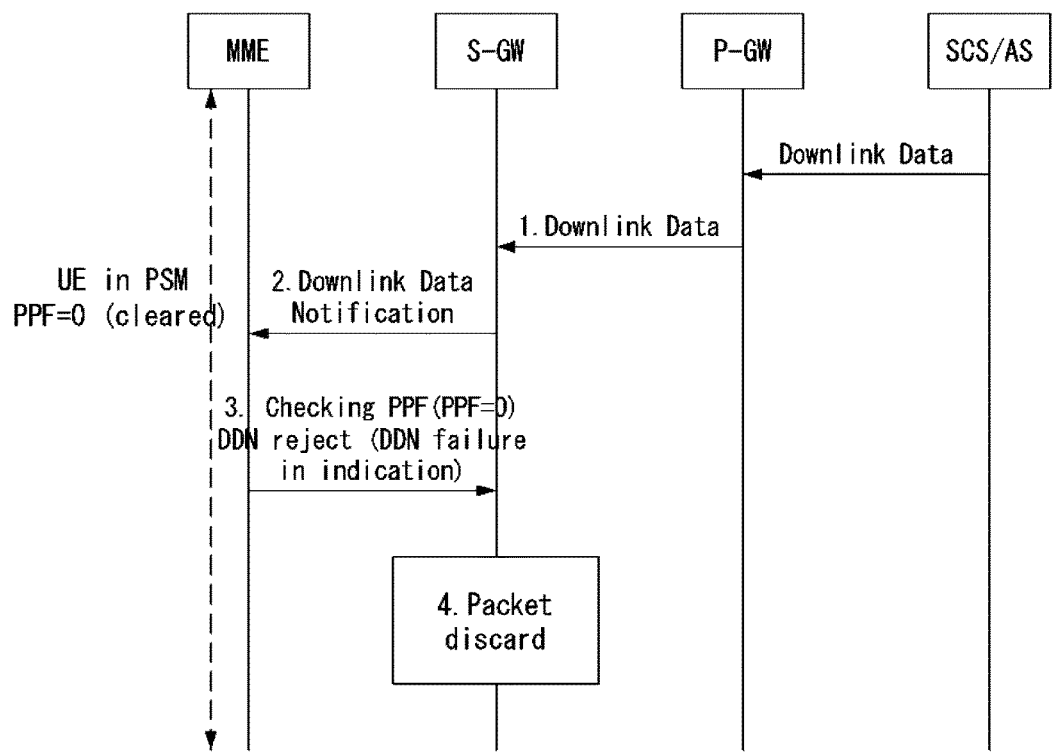

[FIG. 13]
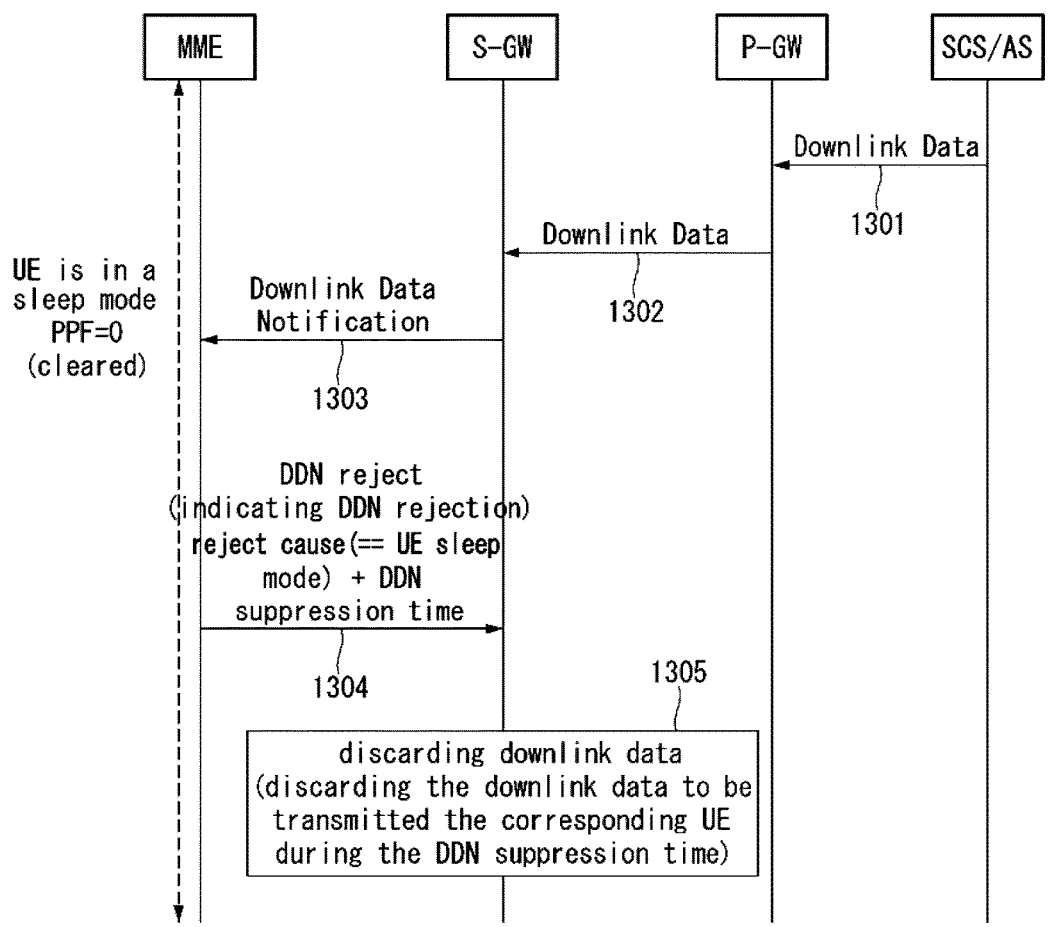

[FIG. 14]
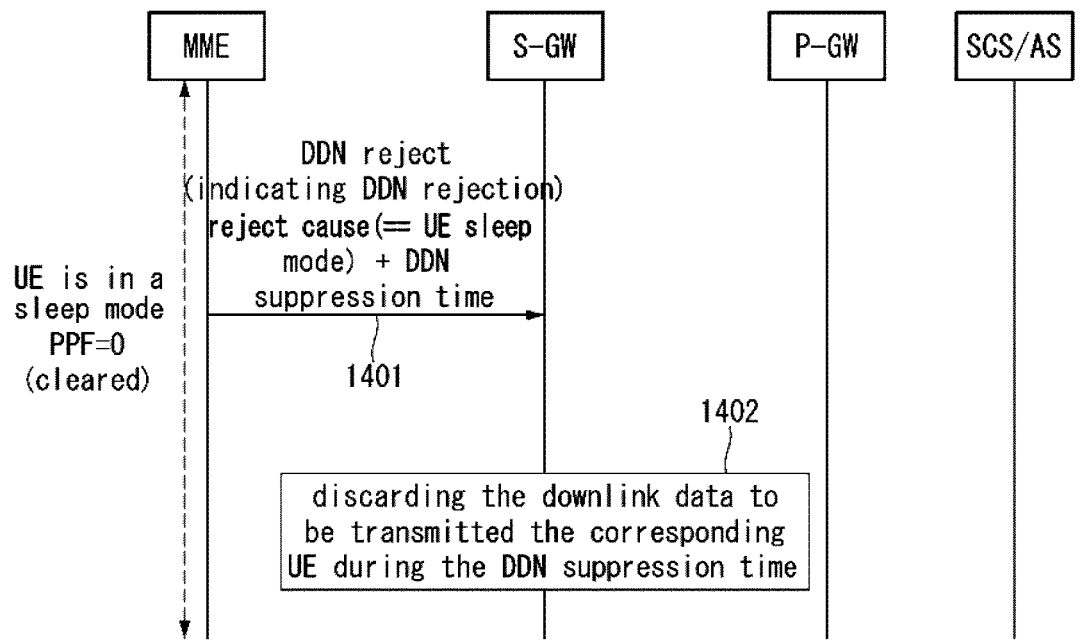

[FIG. 15]
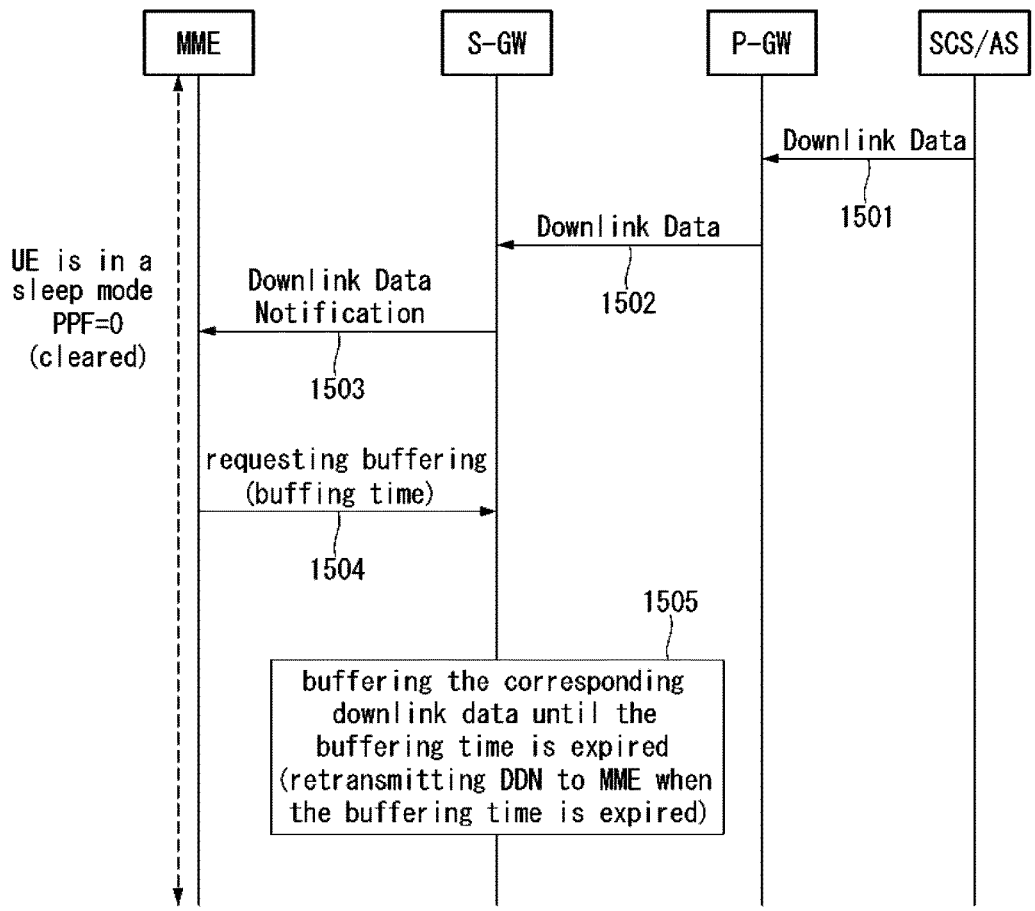
[FIG. 16]
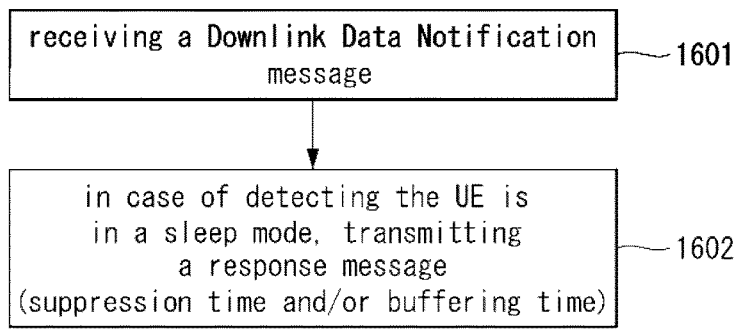

[FIG. 17]
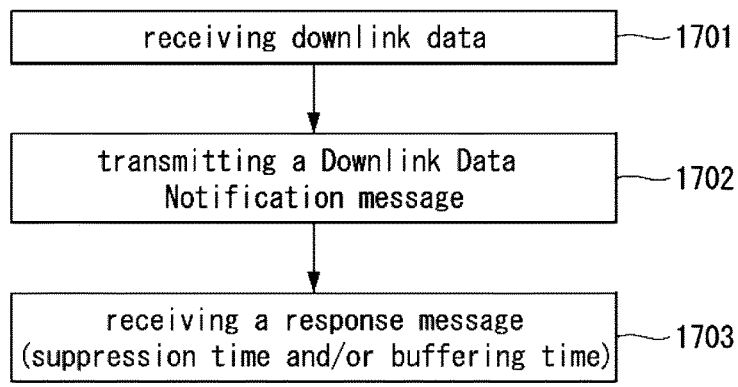
[FIG. 18]
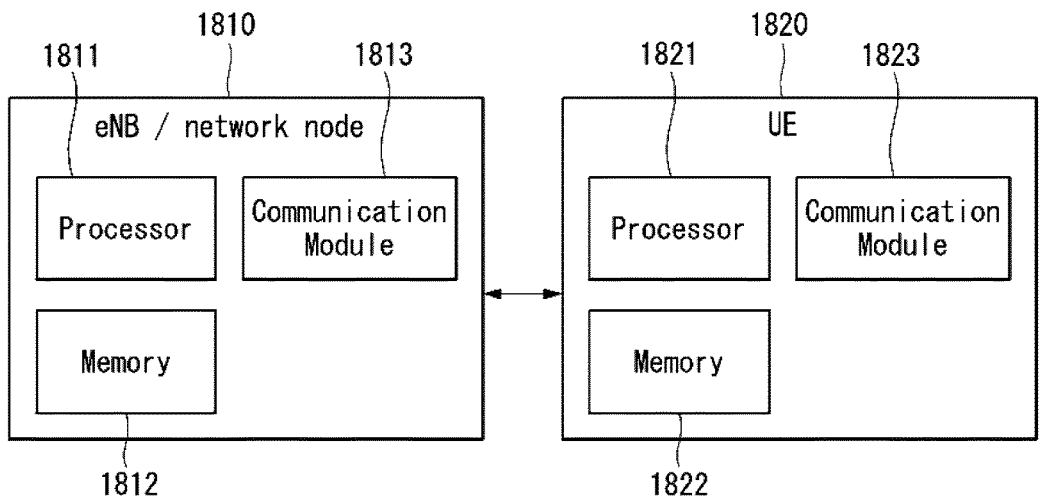

METHOD FOR TRANSMITTING DOWNLINK DATA IN A WIRELESS COMMUNICATION SYSTEM, AND DEVICE FOR SAME

CROSS REFERENCE TO RELATED APPLICATIONS

This application is the National Phase of PCT International Application No. PCT/KR2015/008394, filed on Aug. 11, 2015, which claims priority under 35 U.S.C. 119(e) to U.S. Provisional Application No. 62/035,516, filed on Aug. 11, 2014 and 62/077,924, filed on Nov. 11, 2014, all of which are hereby expressly incorporated by reference into the present application.

TECHNICAL FIELD

The present invention relates to a wireless communication system and, more particularly, to a method for performing or supporting transmission of downlink data to a user equipment in an unreachable state and an apparatus supporting the method.

BACKGROUND ART

Machine Type Communication (MTC) refers to a communication scheme including one or more machines and is also called Machine-to-Machine (M2M) communication. A machine in this context refers to an entity which does not require direction intervention of a human. For example, not only the device such as a meter equipped with a mobile communication module or a vending machine, but also a user equipment such as a smart phone capable of connecting automatically to a network and performing communication without a human intervention is an example of the machine. Various examples of the machine are called MTC devices or terminals in this document. In other words, MTC refers to the communication performed by one or more machines (namely, MTC devices) without incorporating human operation/intervention.

MTC includes communication between MTC devices (for example, Device-to-Device (D2D) communication) and communication between an MTC device and an MTC Application Server. Examples of communication between an MTC device and an MTC application include communication between a vending machine and a server; communication between a Point Of Sale (POS) device and a server; and communication between an electricity, gas, or water meter and a server. Besides, applications based on MTC include security, transportation, and health care.

DISCLOSURE

Technical Problem

The present invention has been made in an attempt to provide a method for transmitting downlink data (or packets) efficiently to constrained devices characterized by low complexity and low energy (for example, Internet of Things (IoT) devices, M2M devices, and category 0 terminals employing a single antenna to realize low complexity).

Also, the present invention has been made in an effort to improve a method for transmitting and receiving downlink data between a Mobile Management Entity (MME) and a Serving Gateway (S-GW).

Technical objects of the present invention are not limited to those objects described above; other technical objects not mentioned above can be clearly understood from what are described below by those skilled in the art to which the present invention belongs.

Technical Solution

A method for transmitting downlink data to a User Equipment (UE) in a wireless communication system according to one aspect of the present invention comprises receiving, by a Mobile Management Entity (MME), a Downlink Data Notification message from a Serving Gateway (S-GW) and in case the MME detects that a UE is in a sleep mode, transmitting, by the MME, a response message for indicating buffering of downlink data to the S-GW, where the response message includes buffering time of the downlink data, and the buffering time is a time period until the UE is expected to switch from the sleep mode to a reachable state.

Preferably, if the buffering time is expired, the MME can receive the Downlink Data Notification message from the S-GW.

Preferably, the MME can transmit an Initial Context Setup Request message to an evolved-Node B (eNB) to configure an S1 bearer.

Preferably, the MME can transmit a paging message to an eNB belonging to a tracking area to which the UE has most recently registered.

A method for transmitting downlink data to a UE in a wireless communication system according to another aspect of the present invention comprises receiving, by a Serving Gateway (S-GW), downlink data to be transmitted to a UE from a Packet Gateway (P-GW), transmitting, by the S-GW, a Downlink Data Notification message to a Mobile Management Entity (MME), and receiving, by the S-GW, a response message for indicating buffering of the downlink data from the MME, where the response message includes buffering time of the downlink data.

Preferably, the buffering time can be a time period until the UE is expected to switch from the sleep mode to a reachable state.

Preferably, if the buffering time is expired, the S-GW can transmit the Downlink Data Notification message to the MME.

Advantageous Effects

According to an embodiment of the present invention, downlink data can be transmitted in an efficient manner to UEs, particularly, to constrained devices with features of low complexity and low energy.

Also, according to an embodiment of the present invention, signaling load can be minimized by improving a Downlink Data Notification transmission and reception procedure between a Mobile Management Entity (MME) and a Serving Gateway (S-GW).

The advantageous effect that can be obtained from the present invention are not limited to those described above, and other effects not mentioned above can be understood clearly by those skilled in the art to which the present invention belongs from the following descriptions.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates a radio interface protocol structure between a UE and an E-UTRAN in a wireless communication system to which the present invention can be applied.

FIG. 4 illustrates an S1 interface protocol structure in a wireless communication system to which the present invention can be applied.

FIG. 5 illustrates an EMM and ECM states in a wireless communication system to which the present invention can be applied.

FIG. 6 illustrates a bearer structure in a wireless communication system to which the present invention can be applied.

FIG. 7 illustrates transmission paths of a control plane and a user plane in an EMM registration state in a wireless communication system to which the present invention can be applied.

FIG. 8 illustrates an Attach procedure in a wireless communication system to which the present invention can be applied.

FIG. 9 illustrates a periodic Tracking Area Update procedure in a wireless communication system to which the present invention can be applied.

FIG. 10 illustrates a UE trigger Service Request procedure in a wireless communication system to which the present invention can be applied.

FIG. 11 illustrates a Network trigger Service Request procedure in a wireless communication system to which the present invention can be applied.

FIG. 12 illustrates a Downlink Data Notification procedure with respect to a UE in a power saving mode in a wireless communication system to which the present invention can be applied.

FIG. 13 illustrates a method for transmitting downlink data according to one embodiment of the present invention.

FIG. 14 illustrates a method for transmitting downlink data according to one embodiment of the present invention.

FIG. 15 illustrates a method for downlink data transmission according to one embodiment of the present invention.

FIG. 16 illustrates a method for transmitting downlink data according to one embodiment of the present invention.

FIG. 17 illustrates a method for transmitting downlink data according to one embodiment of the present invention.

FIG. 18 illustrates a block diagram of a communication device according to one embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above.

Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW), Packet Data Network Gateway (PDN GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved system from the existing UTRAN system; for example, it includes the 3GPP LTE/LTE-A system. The E-UTRAN consists of eNBs providing control plane and user plane protocol to the UE, and the eNBs are connected to each other by means of X2 interface. The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on. The eNB is connected to the UE through a radio interface and is connected to the Evolved Packet Core (EPC) through the S1 interface. The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

FIG. 3 illustrates a radio interface protocol structure between a UE and an E-UTRAN in a wireless communication system to which the present invention can be applied.

FIG. 3(a) illustrates a radio protocol structure for the control plane, and FIG. 3(b) illustrates a radio protocol structure for the user plane.

With reference to FIG. 3, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

The logical channel is on top of the transport channel and is mapped to the transport channel. The logical channel can be divided into a control channel for delivery of control area information and a traffic channel for delivery of user area information. Examples of the logical channel are a Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), and Multicast Traffic Channel (MTCH). FIG. 4 illustrates an S1 interface protocol structure in a wireless communication system to which the present invention can be applied.

FIG. 4(a) illustrates the control plane protocol stack in the S1 interface, and FIG. 4(b) illustrates the user plane interface protocol structure in the S1 interface.

With reference to FIG. 4, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM State

In what follows, EPS Mobility Management (EMM) and EPS Connection Management (ECM) states will be described.

FIG. 5 illustrates an EMM and ECM states in a wireless communication system to which the present invention can be applied.

With reference to FIG. 5, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM-IDLE states can also be applied to the UE and the MME. ECM connection consists of RRC to connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

FIG. 6 illustrates a bearer structure in a wireless communication system to which the present invention can be applied.

When the UE is connected to a Packet Data Network (PDN) (which is the peer entity of FIG. 6), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the SS bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 7 illustrates transmission paths of a control plane and a user plane in an EMM registration state in a wireless communication system to which the present invention can be applied.

FIG. 7(a) illustrates ECM-CONNECTED state, and FIG. 7(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 7(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 7(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

Method for Monitoring a Downlink Control Channel for a UE in Discontinuous Reception (DRX) Mode The 3GPP LTE/LTE-A system defines EPS Connection Management (ECM)-CONNECTED state and ECM-IDLE state to manage signaling connection between the UE and the network. The ECM-CONNECTED state and ECM-IDLE state can also be applied to the UE and the MME. ECM connection comprises RRC connection established between the UE and the eNB; and S1 signaling connection established between the eNB and the MME. RRC state shows whether the RRC layer of the UE is logically connected to the RRC layer of the eNB. In other words, in case the RRC layer of the UE and the RRC layer of the eNB are connected to each other, the UE stays in the RRC_CONNECTED state. On the other hand, if the RRC layer of the UE is not connected to the RRC layer of the eNB, the UE stays in the RRC_IDLE state.

At this time, the RRC_CONNECTED state refers to the state where the UE is connected to a particular cell and indicates that the UE can receive a service in the cell unit, where the UE is managed in units of cells.

RRC_IDLE state refers to the state where no connection is established between the UE and the eNB, but only the connection to a Mobility Management Entity (MME) is maintained; in the RRC_IDLE state, the UE is managed in the Tracking Area (TA) unit which is an area unit larger than a cell. In other words, the UE in the RRC_IDLE state wakes up intermittently and monitors the Paging Channel (PCH) to check whether there is a paging message being transmitted to the UE. In other words, the UE performs Discontinuous Reception (DRX) set up by the Non-Access Stratum (NAS) by using the ID allocated uniquely in the tracking area. The UE can receive a broadcast signal of the system information and paging information by monitoring a paging signal for a specific paging event at each UE-specific paging DRX cycle. The UE which does not receive any activated service through the aforementioned network state definitions eventually minimizes its power consumption, and thus the eNB can utilize resources in an efficient manner.

As described above, to receive general mobile communication services such as voice and data communication, the UE has to make a transition to the ECM-CONNECTED state. As in the case when the UE is first powered on, the initial UE stays in the ECM-IDLE state; if the UE successfully registers to the corresponding network through an initial attach procedure, the UE and the MME makes a transition to the ECM-CONNECTED state. Also, in case the UE has been registered to the network but radio resources are not allocated to the UE as traffic is not activated, the UE stays in the ECM-IDLE state; if uplink or downlink traffic is newly generated in the corresponding UE, the UE and the MME make a transition to the ECM-CONNECTED state through a Service Request procedure.

The 3GPP LTE/LTE-A system defines a dormant mode and an active mode even for the RRC_CONNECTED state to minimize power consumption of the UE.

According to the definition above, if the UE staying in the RRC_CONNECTED state does not transmit or receive data for a predetermined time period, cell connection is retained, but the UE is made to enter the dormant mode. The UE staying in the dormant mode has to occasionally wake up and monitor a physical control channel to receive data that may be transmitted to the UE.

As described above, a wireless communication system employs a Discontinuous Reception (DRX) scheme of the UE to minimize power consumption of the UE.

The DRX method defined in the 3GPP LTE/LTE-A system can be used both for the dormant mode and the RRC_IDLE mode, and the DRX methods used in the respective modes are as follows.

1) Dormant mode in the RRC_CONNECTED state
Short DRX: short DRX cycle (2 ms~640 ms)
Long DRX: long DRX cycle (10 ms~2560 ms)

2) RRC_IDLE state

Paging DRX: paging DRX cycle (320 ms~2560 ms)

The UE can perform monitoring of the PDCCH based on its unique identifier, RNTI (for example, C-RNTI, SI-RNTI, P-RNTI, and so on).

Monitoring of the PDCCH can be controlled by the DRX operation, and the eNB transmits the parameters related to the DRX to the UE through the RRC message. In particular, the UP has to always receive the SI-RNTI, P-RNTI, and so on irrespective of the DRX operation composed by the RRC message. At this time, the other PDCCHs excluding the PDCCH scrambled with the C-RNTI are always received through the common search space of a main serving cell (for example, Pcell).

If the DRX parameters are set up while the UE is in the RRC_CONNECTED state, the UE performs discontinuous monitoring of the PDCCH based on the DRX operation. On the other hand, if the DRX parameters are not set up, the UE performs continuous monitoring of the PDCCH.

In other words, the UE searches the PDCCH by performing blind decoding in a UE-specific search space of the PDCCH region based on the DRX operation. If no CRC error is detected when the UE unmasks the CRC of the PDCCH by using the RNTI, the UE regards that the corresponding PDCCH delivers the UE's control information.

Discontinuous PDCCH monitoring indicates that the UE m monitors the PDCCH only in specific subframes, while continuous PDCCH monitoring indicates that the UE monitors the PDCCH for all of the subframes. Meanwhile, in case PDCCH monitoring is required in the operation unrelated to the DRX such as the random access procedure, the UE monitors the PDCCH according to the requirements of the corresponding operation.

Also, the UE receiving a paging message as described above can perform DRX to reduce power consumption.

To this purpose, the network configures a plurality of paging occasions for each time period called a paging cycle, a specific UE receives paging messages only at the time of specific paging occasions, and the UE does not receive a paging channel except for the specific paging occasions. Also, one paging occasion corresponds to one TTI.

Attach Procedure

For most cases, the attach procedure is used when the UE enters an E-UTRAN cell to establish a connection to a network. Also, the attach procedure can also be used when the UE performs handover from a non-3GPP network to the E-UTRAN.

FIG. 8 illustrates an attach procedure in a wireless communication system to which the present invention can be applied.

1-2. The UE initiates the attach procedure by transmitting an Attach Request message to the MME. The Attach Request message includes the International Mobile Subscriber Identity of the UE.

The Attach Request message is delivered being included in the RRC connection setup complete message through the RRC connection and is delivered being included in the initial UE message through the S1 signaling connection.

3. For authentication of the UE, the MME requests and receives information for the authentication from the HSS; and performs mutual authentication with the UE.

4. The MME registers the position of the UE in the HSS and to create a default bearer for the UE, receives user subscription information (namely, subscribed QoS profile) from the HSS.

5-6. The MME requests creation of a default bearer by transmitting a Create Session Request message to the S-GW, and the S-GW delivers the Create Session Request message to the P-GW. The Create Session Request message includes a QoS profile and S5 S-GW Tunnel Endpoint Identifier (TEID) from the HSS.

7. The P-GW allocates an IP address to be used by the UE and performs an IP Connectivity Access Network (IP-CAN) session establishment/modification procedure with the PCRF.

8. The P-GW transmits a Create Session Response message to the S-GW in response to the Create Session Request message. The Create Session Response message includes a QoS profile and S5 P-GW TEID to be applied to the default bearer.

When this procedure is done, the creation of S5 bearer is completed between the S-GW and the P-GW, and the S-GW is then able to transmit uplink traffic to the P-GW or to receive downlink traffic from the P-GW.

9. The S-GW transmits a Create Session Response message including S1 S-GW TEID to the MME in response to the Create Session Request message.

10-11. The MME transmits an Attach Accept message including an IP address allocated by the P-GW, a Tracking Area Identity (TAI) list, and a TAU timer to the UE in response to an Attach Request message.

The Attach Accept message is delivered being included in the Initial Context Setup Request message through the S1 signaling connection. The Initial Context Setup Request message includes the S1 S-GW TEID.

When this procedure is done, the uplink S1 bearer is created between the eNB and the S-GW, and the eNB is then able to transmit uplink traffic to the S-GW.

The Attach Accept message is delivered being included in an RRC Connection Reconfiguration message through the RRC connection.

When this procedure is done, the creation of DRB is completed between the UE and the eNB, and the UE is then able to transmit uplink traffic to the eNB or to receive downlink traffic from the eNB.

12. The eNB transmits an Initial Context Setup Response message to the MME in response to an Initial Context Setup Request message. The Initial Context Setup Response message includes S1 eNB TEID.

13-14. The UE transmits an Attach Complete message to the MME in response to the Attach Accept message.

The Attach Complete message is delivered being included in a UL Information Transfer message through the RRC connection and is delivered being included in a UL NAS Transport message through the S1 signaling connection.

When this procedure is done, a creation of default EPS bearer is completed between the UE and the P-GW, and the UE is then able to transmit uplink data to the P-GW.

15. The MME delivers S1 eNB TEID received from the eNB to the S-GW through a Modify Bearer Request message.

When this procedure is done, a creation of downlink S1 bearer is completed between the eNB and the S-GW, and the eNB is then able to receive downlink traffic from the S-GW.

16-17. Depending on the needs, the bearer between the S-GW and the P-GW is updated.

18. The S-GW transmits a Modify Bearer Response message to the MME in response to the Modify Bearer Request message.

When this procedure is done, a creation of downlink default EPS bearer is completed between the UE and the P-GW, and the P-GW is then able to transmit downlink data to the UE.

Periodic TAU Procedure

The Tracking Area Update (TAU) procedure is performed when the UE staying in the ECM-IDLE state attempts registering a new position or the TAU timer expires.

FIG. 9 illustrates a periodic tracking area update procedure in a wireless communication system to which the present invention can be applied.

1-2. If the TAU timer of the UE in the ECM-IDLE state expires, the Periodic TAU (P-TAU) procedure for reporting a Tracking Area (TA) to the MME is triggered.

The UE initiates the P-TAU procedure by transmitting a TAU Request message to the MME.

The TAU Request message is delivered being included in an RRC connection setup complete message through the RRC connection and is delivered being included in the initial UE message through the S1 signaling connection.

3. The MME which receives the TAU Request message resets the TAU timer and transmits a Modify Bearer Request message including an E-UTRAN Cell Global Identifier (ECGI) and a TAI to the S-GW.

4-5. In case the cell (ECGI) or the tracking area (TAI) in which the UE is located changes, the S-GW transmits the Modify Bearer Request message to the P-GW.

The P-GW performs an EPS session update procedure and m transmits a Modify Bearer Response message to the S-GW in response to the Modify Bearer Request message.

6. The S-GW transmits a Modify Bearer Response message to the MME in response to the Modify Bearer Request message.

7-8. The MME transmits a TAU Accept message to the UE in response to a TAU Request message.

The TAU Accept message can include the TAU timer.

The TAU Accept message is delivered being included in a downlink NAS transport message through the S1 signaling connection and delivered being included in a downlink information transfer message through the RRC connection.

9. The MME which has completed a position update of the UE releases connection to the UE used for transmission and reception of the periodic TAU-related message and transmits a UE context release command to the eNB to release the user context set up within the E-UTRAN.

10. The eNB deletes the context of the UE and releases resources allocated to the UE. And the eNB releases RRC connection to the UE by transmitting an RRC connection release message to the UE.

11. The eNB transmits a UE context release complete message to the MME in response to a UE context release command message, thereby releasing the S1 signaling connection between the eNB and the MME.

When the procedure above is completed, the UE again makes a transition to the ECM-IDLE state.

Service Request Procedure

For most cases, the UE-triggered Service Request procedure is used when the UE initiates a new service or attempts to transmit uplink data in response to a paging message.

FIG. 10 illustrates a UE trigger Service Request procedure in a wireless communication system to which the present invention can be applied.

1-2. The UE initiates a UE-triggered Service Request procedure by transmitting a Service Request message to the MME.

The Service Request message is delivered being included in an RRC connection setup complete message through the RRC connection and delivered being included in an initial UE message through the S1 signaling connection.

3. For authentication of the UE, the MME requests and receives information for the authentication from the HSS; and performs mutual authentication with the UE.

4. The MME transmits an Initial Context Setup Request message to the eNB so that the eNB can configure an S1 bearer with the S-GW and configure a DRB with the UE.

5. The eNB transmits an RRC Connection Reconfiguration message to the UE to create the DRB.

When this procedure is done, the creation of DRB is completed between the eNB and the UE, and all of uplink EPS bearers ranging from the UE to the P-GW are configured. The UE can transmit uplink traffic data to the P-GW.

6. The eNB transmits an Initial Context Setup Complete message including 'S1 eNB TEID' to the MME in response to the Initial Context Setup Request message.

7. The MME delivers the 'S1 eNB TEID' received from the eNB to the S-GW through a Modify Bearer Request message.

When this procedure is done, the creation of S1 bearer is completed between the eNB and the S-GW, and then all of the downlink EPS bearers ranging from the P-GW and the UE are configured. The UE can then receive downlink traffic data from the P-GW.

8. In case the cell (ECGI) or the tracking area (TAI) in which the UE is located changes, the S-GW transmits the Modify Bearer Request message to the P-GW.

9. If needed, the P-GW can perform an IP connectivity access network (IP-CAN) session modification procedure with the PCRF.

10. Receiving a Modify Bearer Request message from the S-GW, the P-GW transmits a Modify Bearer Response message to the S-GW in response to the message.

11. The S-GW transmits a Modify Bearer Response message to the MME in response to the Modify Bearer Request message.

A network-triggered Service Request procedure is usually performed when the network attempts to transmit downlink data to the UE staying in the ECM-IDLE state.

FIG. 11 illustrates a Network trigger Service Request procedure in a wireless communication system to which the present invention can be applied.

1. If downlink data arrives at the P-GW via an external network, the P-GW delivers downlink data to the S-GW.

2. In case the downlink S1 bearer is released and unable to transmit downlink data to the eNB (namely, in case 'S1 eNB TEID' value is not found in the S-GW), the S-GW buffers the received downlink data. And the S-GW transmits a Downlink Data Notification message to the MME to which the UE is registered for signaling connection and bearer configuration with respect to the corresponding UE.

The MME transmits a Downlink Data Notification ACK message to the S-GW in response to the Downlink Data Notification message.

3. The MME transmits a paging message to the eNB belonging to the tracking area to which the UE has most recently registered.

4. If the eNB receives a paging message from the MME, the eNB broadcasts the paging message.

5. The UE, noticing the existence of downlink data directed to itself, sets up an ECM connection by performing a Service Request procedure.

The Service Request procedure can be performed in the same way as the procedure of FIG. 10, and if the procedure is completed, the UE can receive downlink data from the S-GW.

Power Saving Mode

Power Saving Mode (PSM) is one of the 3GPP rel-12 MTCe (Enhancement for MTC) features, where the UE can minimize power consumption by defining an interval in which the UE deactivates all of the Access Stratum (AS) operations such as paging reception and mobility management. In other words, a UE supporting the PSM may compromise with the network on the Active Time and periodic TAU timer or receive the Active Time and periodic TAU timer from the network during attach and tracking area update.

If the UE receives the Active Time value from the network, when the UE transits from the ECM-CONNECTED to the ECM-IDLE state, the UE receives a paging message by staying in the ECM-IDLE state during the corresponding Active Time period. And if the Active Time period is expired, the UE enters the PSM and deactivates all Access Stratrum (AS) operations.

Also, the MME initiates the Active timer by applying the Active Time value each time the UE enters the ECM-IDLE mode. And if the Active timer is expired, the MME deduces that the UE is unreachable.

In other words, Active Time refers to the time period m during which the UE supporting the state employing a power saving function (for example, PSM) stays in the ECM-IDLE (or RRC_IDLE) state.

If the periodic TAU timer expires, the UE again enables the AS operation and performs the TAU, and the network stops the implicit detach timer of the corresponding UE. The UE can wake up anytime for a mobile originated call (for example, uplink data packet transfer).

On the other hand, the UE wakes up at each P-TAU period and performs TAU to deal with mobile terminated calls (for example, downlink data packet receiving); performs the paging receiving operation during the received Active Time; and again enters the PSM mode to sleep.

In case the UE enters the PSM, when downlink data to be transmitted to the corresponding UE are generated, the following process can be performed.

FIG. 12 illustrates a Downlink Data Notification procedure with respect to a UE in a power saving mode in a wireless communication system to which the present invention can be applied.

FIG. 12 assumes that the UE has entered the PSM. Recognizing that the UE has entered the PSM, the MME clears the Packet Proceed Flag (PPF) (namely, PPF=0).

1. If downlink data to be transmitted to the UE are generated, the Application Server (AS) (or SCS) transmits the downlink data to the P-GW, and the P-GW transmits received downlink data to the S-GW.

2. In case the S-GW receives the downlink data from the P-GW and finds that there is no active S1-U connection of the corresponding UE (namely, the S1 bearer is released), the S-GW transmits a Downlink Data Notification (DDN) message to the MME and buffers the received downlink data. The DDN message notifies the UE of existence of downlink data to be transmitted.

3. If receiving the DDN from the S-GW, the MME checks the PPF. As in the example of FIG. 12, in case the MME clears the PPF (namely, PPF=0), the MME transmits a DDN reject message indicating a DDN failure (or including indication of a DDN failure) in response to the DDN received from the S-GW. The DDN reject message can include a reject cause.

4. The S-GW having received the DDN reject message discards the corresponding downlink data.

As described above, in case the AS transmits downlink data while not knowing whether the UE is in the sleep mode (namely, whether the UE enters the PSM), the downlink data are eventually discarded in the S-GW, and the AS fails to receive a response of the transmission; thus, the AS attempts to perform the re-transmission operation with respect to the corresponding downlink data.

Method for Transmitting Downlink Data

The present invention provides a method for supporting transmission of downlink data (or downlink packets or downlink packet data) to the UE in an efficient manner.

In particular, the present invention provides a method for transmitting downlink data efficiently to constrained devices characterized by low complexity and low energy (for example, Internet of Things (IoT) devices, M2M devices, and category 0 terminals employing a single antenna to realize low complexity) in case the constrained devices enter a sleeping mode for a long time to minimize power consumption.

In what follows, the unreachable state of the UE refers to the state where the UE uses the power saving function (for example, the PSM or extended idle mode DRX). In what follows, for the convenience of description, the unreachable state of the UE is collectively called a 'sleep' state.

The extended DRX (eDRX) is the function intended to minimize power consumption of the UE by extending the maximum existing paging DRX cycle of 2.56 sec to a few minutes to a maximum of tens of minutes. The eDRX can be applied to the idle mode and connected mode.

In other words, in the case of a UE supporting the PSM, the unreachable state of the UE may refer to the state where the UE has already entered the PSM. Also, in the case of a UE supporting the eDRX mode, the unreachable state of a UE may refer to the unreachable state of a UE by paging (namely, the DRX interval for which the UE does not monitor the paging channel).

On the other hand, the reachable state of a UE refers to the state where the UE stays in the ECM-CONNECTED mode or ECM-IDLE mode in which the UE applies a normal DRX period (for example, less than 2.56 sec). For example, in the case of a UE supporting the PSM, the reachable stated may refer to the state where the UE is stays in connected mode or in the Active Time period, since the UE retains idle mode during the Active Time period. For example, in the case of a UE supporting the eDRX mode, the reachable state may refer to the state where the UE is reachable immediately by the ECM-CONNECED mode and/or paging (namely, the interval for which the UE monitors the paging channel). In other words, eDRX has a DRX interval relatively longer than the normal DRX mode; thus, it may be determined that the UE is temporarily unreachable even in the idle interval. That is, in the case of the normal DRX mode (2.56 seconds), data delivery is possible after a maximum of 2.56 seconds; however, if eDRX (10 minutes) is applied, the maximum delay is 10 minutes and therefore, immediate data delivery is not possible, which can be regarded that the UE is actually unreachable.

In case the UE enters the sleep mode due to PSM, and so on as in the example of FIG. 12, since the MME rejects the DDN that the S-GW transmits, the S-GW discards the corresponding downlink data.

Also, in case the UE does not support a power saving function such as PSM and eDRX, the PPF is seldom cleared, and since the UE does not perform the TAU procedure even if the P-TAU timer is expired, the MME determines that the corresponding UE is unreachable.

However, it is a highly plausible scenario that an Application Server (AS)/Service Capability Server (SCS) transmits downlink data to the UE in the sleep mode.

In this scenario, there are chances that the AS/SCS continuously attempts re-transmission of downlink data or continuously transmits downlink data due to a false operation.

Also, in this scenario, inefficient handshaking occurs frequently, where the S-GW sends the DDN to the MME, the MME checks the PPF and sends a reject message to the S-GW, and accordingly, the S-GW again discards the corresponding downlink data, thereby increasing signaling load between the MME and the S-GW.

Therefore, the present invention provides a method for improving an inefficient Downlink Data Notification (DDN) operation for processing downlink data received by the S-GW in case the UE is in the sleep mode.

In particular, the present invention proposes a condition for suppressing transmission of DDN from the S-GW to the MME and a notification procedure, thereby enabling the DDN procedure to be performed efficiently. Also, the present invention provides a method which enables efficient handling of downlink data by adding a procedure for the MME to command retaining buffering and DDN retry rather than to discard downlink data depending on situations.

The MME holds the information about whether the UE is currently in the sleep mode (for example, in the PSM or in a state where the UE is unreachable through paging in the eDRX mode) and information about the time period until the corresponding UE is reachable after the sleep mode.

If the MME allocates Active Time to the UE, the MME initiates the Active timer by using the Active Time value each time the corresponding UE enters the ECM-IDLE mode. And if the Active timer is expired within the MME, the MME can deduce that the UE is unreachable and clears the PPF flag within the MME.

Also, in the case of a UE in the eDRX mode, the MME can know at each paging period set up in the corresponding UE whether the corresponding UE is in the sleep mode (namely, an unreachable state through paging) or in a reachable state through paging.

The UE in the EMM-REGISTERED state performs a Periodic TAU (P-TAU) procedure with the network if the P-TAU timer is expired. The P-TAU timer of the UE restarts with the initial m value each time the UE enters the ECM-IDLE mode. The MME activates a UE reachable timer. Each time the UE enters the ECM-IDLE mode, the UE reachable timer is restarted, and a value similar to the P-TAU timer of the UE is given to the UE reachable timer. If the UE reachable timer is expired within the MME, the MME can deduce that the UE is not reachable.

As described above, since the MME knows the information about whether the UE is in the sleep mode and the information about the time period until the corresponding UE becomes reachable after the sleep mode, the present invention provides an operation for suppressing DDN transmission of the S-GW. The aforementioned operation will be described with reference to the subsequent drawings.

FIG. 13 illustrates a method for transmitting downlink data according to one embodiment of the present invention.

FIG. 13 assumes that the UE is in the sleep mode (for example, in the PSM or in a state where the UE is unreachable through paging in the eDRX mode). Recognizing that the UE has entered the sleep mode, the MME clears the PPF.

With reference to FIG. 13, if the SCS/AS wants to transmit downlink data (for example, downlink data packets or downlink control signaling) to the UE, the AS/SCS transmits downlink data to the P-GW S1301.

The P-GW transmits the downlink data received from the SCS/AS to the S-GW S1302.

If the corresponding UE has no active S1-U connection (namely, S1 bearer has been released) when the S-GW receives downlink data from the P-GW, the S-GW buffers the received downlink data and identifies an MME which provides a service to the UE.

And the S-GW transmits a Downlink Data Notification (DDN) message to the MME S1303.

Detecting that the corresponding UE is in the sleep mode (for example, in the PSM or in a state where the UE is unreachable through paging in the eDRX mode), the MME transmits a DDN reject message indicating DDN rejection (or including DDN reject indication) to the S-GW in response to the DDN message S1304.

At this time, the reject cause can be set as 'US sleep mode (for example, UE is in PSM)'.

Also, the MME can set up a reachable time of the UE after the sleep mode with a DDN suppression time value and transmit the reachable time to the S-GW by incorporating it into the DDN reject message. Here, the reachable time of the UE may refer to the time period ranging from the moment the MME receives a DDN message from the S-GW or transmits a DDN reject message to the moment until the UE enters a reachable state. For example, the reachable time may correspond to the remaining P-TAU period or the remaining paging-enabled period.

The S-GW which has received the DDN reject message from the MME discards downlink data S1305.

And the S-GW runs DDN suppression time. Afterwards, the S-GW discards all of the downlink data with respect to the corresponding UE being received from the P-GW until the DDN suppression time is expired and does not transmit the DDN to is the MME.

At this time, the S-GW can choose whether to buffer the corresponding downlink data (namely, the downlink data which have triggered DDN transmission) according to the size of the received DDN suppression time.

For example, in case the DDN suppression time is relatively short (for example, less than a predetermined threshold), the S-GW can determine buffering of the corresponding downlink data. In case the S-GW receives a DDN reject message and buffers the corresponding downlink data as described above (based on the S-GW's own decision), the S-GW can re-transmit the DDN with respect to the buffered, corresponding downlink data to the MME if the DDN suppression time is expired.

On the other hand, in case the DDN suppression time is relatively long (for example, larger than a predetermined threshold), the S-GW can determine discarding the corresponding downlink data.

FIG. 13 illustrates an operating sequence where the MME commands (indicates) the S-GW to perform DDN suppression and to discard the corresponding downlink data through the DDN reject message; and incorporates the suppression time into the DDN reject message, but the present invention is not limited to the illustration. In other words, as in the example of FIG. 11, the MME may command the S-GW to perform DDN suppression and to discard the corresponding downlink data through a Downlink Data Notification ACK message and transmit the suppression time by incorporating it into the Downlink Data Notification ACK message.

FIG. 14 illustrates a method for transmitting downlink data according to one embodiment of the present invention.

FIG. 14 assumes that the UE is in the sleep mode (for example, in the PSM or in a state where the UE is unreachable through paging in the eDRX mode).

Recognizing that the UE has entered the sleep mode (for example, in the PSM or in a state where the UE is unreachable through paging in the eDRX mode), the MME clears the PPF and transmits a DDN reject message indicating DDN rejection (or including DDN reject indication) to the S-GW S1401.

In other words, if the MME detects the UE's entering the sleep mode independently of receiving a DDN message from the S-GW, the MME transmits a DDN reject message to the S-GW.

At this time, the reject cause can be set as 'UE sleep mode (for example, UE is in PSM)'.

Also, the MME can set up a reachable time of the UE after the sleep mode with a DDN suppression time value and transmit the reachable time to the S-GW by incorporating it into the DDN reject message. Here, the reachable time of the UE may refer to the time period ranging from the moment the MME receives a DDN message from the S-GW or transmits a DDN reject message to the moment until the UE enters a reachable state. For example, the reachable time may correspond to the remaining P-TAU period or the remaining paging-enabled period.

The S-GW, which has received the DDN reject message from the MME, runs DDN suppression time, discards all of the downlink data with respect to the corresponding UE being received from the P-GW until the DDN suppression time is expired, and does not transmit the DDN to the MME S1402.

At this time, the S-GW can choose whether to buffer the corresponding downlink data (namely, the downlink data which have triggered DDN transmission) according to the size of the received DDN suppression time.

For example, in case the DDN suppression time is relatively short (for example, less than a predetermined threshold), the S-GW can determine buffering of the corresponding downlink data. In case the S-GW receives a DDN reject message and buffers the corresponding downlink data as described above (based on the S-GW's own decision), the S-GW can re-transmit the DDN with respect to the buffered, corresponding downlink data to the MME if the DDN suppression time is expired.

On the other hand, in case the DDN suppression time is relatively long (for example, larger than a predetermined threshold), the S-GW can determine discarding the corresponding downlink data.

Meanwhile, different from the examples of FIGS. 13 and 14, instead of using the DDN suppression time, the MME may explicitly inform the S-GW of DDN suppression with respect to the UE in the sleep mode and start and end of discarding of downlink data.

In other words, if the MME which has received a DDN message from the S-GW detects that the corresponding UE is in the sleep mode (for example, in the PSM or in a state where the UE is unreachable through paging in the eDRX mode), the MME can explicitly request (or command) the S-GW to start DDN suppression instead of suppression time. And if the MME detects that the corresponding UE has got out of the sleep mode (namely, the UE's switching to a wake-up state (or an active state)), the MME can explicitly request (or command) the S-GW to terminate the DDN suppression instead of suppression time.

The S-GW can detect that the UE has got out of the sleep mode, if the S1-U is set up by the service request of the UE or signaling with respect to the corresponding UE is transmitted, and transmit again the DDN for downlink data transmission to the MME. However, if the service request of the UE is not related to the S1-U setup or TAU is not related to the relocation of the MME/S-GW, the S-GW is unable to detect whether the UE has escaped the sleep mode. Therefore, since the S-GW cannot detect exactly whether the UE is in the sleep mode, the MME can transmit a message intended to inform the S-GW that the UE has woken up to release DDN suppression to the S-GW in case the MME has explicitly transmitted a message commanding DDN suppression.

In other words, in case the MME transmits a message notifying that the UE is in the sleep mode (namely, a message indicating start of the DDN suppression) to the S-GW, the MME has to transmit a message notifying that the UE is in the wake-up state (namely, a message indicating the end of the DDN suppression) to the S-GW so that the S-GW can detect explicitly that the UE has escaped the sleep mode.

According to the embodiment described above, as the MME suppresses DDN transmission of the S-GW, the DDN procedure between the MME and the S-GW (namely, signaling according to the DDN procedure) can be minimized.

As another embodiment of the present invention, the MME can indicate (or command) the S-GW to buffer (namely, to postpone DDN) downlink data with respect to the UE in the sleep mode (for example, in the PSM or in a state where the UE is unreachable through paging in the eDRX mode)

FIG. 15 illustrates a method for downlink data transmission according to one embodiment of the present invention.

FIG. 15 assumes that the UE is in the sleep mode (for example, in the PSM or in a state where the UE is unreachable through paging in the eDRX mode). If the MME detects that the UE has entered the sleep mode, the MME clears the PPF.

With reference to FIG. 15, if the SCS/AS wants to transmit downlink data (for example, downlink data packets or downlink control signaling) to the UE, the AS/SCS transmits downlink data to the P-GW S1501.

The P-GW transmits the downlink data received from the SCS/AS to the S-GW S1502.

If the corresponding UE has no active S1-U connection (namely, S1 bearer has been released) when the S-GW receives downlink data from the P-GW, the S-GW buffers the received downlink data and identifies an MME which provides a service to the UE.

And the S-GW transmits a Downlink Data Notification (DDN) message to the MME S1503.

Detecting that the UE is in the sleep mode (for example, in the PSM or in a state where the UE is unreachable through paging in the eDRX mode), the MME transmits a response message for indicating buffering of downlink data to the S-GW S1504.

For example, the MME may indicate (or command) buffering of the downlink data by transmitting a Buffering Request message (namely, a response message) to the S-GW.

At this time, the MME can transmit the Buffering Request message by including the buffering time (or valid time) during which the S-GW has to buffer (or maintain) the corresponding downlink data.

At this time, the buffering time (or valid time) may be a time period until the UE is expected to switch from the sleep mode again to a reachable state.

In other words, the buffering time (or valid time) may indicate the time period ranging from when the UE is in the sleep mode (for example, in the PSM or in a state where the UE is unreachable through paging in the eDRX mode) until the UE is expected to wake up. Therefore, the MME can request (or command) the S-GW to buffer downlink data by specifying the time period ranging from when the UE is in the sleep mode (for example, in the PSM or in a state where the UE is unreachable through paging in the eDRX mode) until the UE is expected to wake up.

For example, in case the UE is unreachable due to applying the PSM, the buffering time can be calculated as the remaining P-TAU time. Or, in case the UE is unreachable due to applying the eDRX, the buffering time can be calculated as the DRX period of the UE.

FIG. 15 illustrates a situation where the MME indicates (or commands) the S-GW to buffer the corresponding downlink data through a Buffering Request message and incorporates the buffering time (or valid time) into the Buffering Request message, but the present invention is not limited to the above situation. In other words, as in the example of FIG. 11, the MME may indicates (or command) the S-GW to buffer the corresponding downlink data through the Downlink Data Notification ACK message and transmit the Downlink Data Notification ACK message by incorporating the buffering time (or valid time) thereto.

If the S-GW receives a buffering indication (or command) with respect to downlink data from the MME, the S-GW buffers (or retains) the corresponding downlink packets until the buffering time (or valid time) is expired S1505.

At this time, if the buffering time (or valid time) is expired, the S-GW can retransmit the DDN to the MME. In other words, the S-GW does not transmit the DDN to the MME until the buffering time (or valid time) is expired. Or, as described above, since the buffering time (or valid time) can be indicated as the time period required for the UE to switch again to a reachable state, the S-GW can transmit the buffered downlink data to the corresponding UE as the MME sets up the S1-U (namely, configures the S1 bearer) when the UE switches to a reachable state or as the MME (or the eNB) transmits paging to the UE depending on situations.

More specifically, in case the UE is unreachable due to applying the PSM, if TAU is triggered as the P-TAU timer is expired, the S-GW can transmit the buffered downlink data to the corresponding UE through the eNB by MME's setting up the S1-U.

Or, in case the UE is unreachable due to applying the eDRX, as the MME or the eNB transmits a paging message at a paging occasion and the UE sets up the S1-U through a Network-triggered Service Request procedure, the S-GW can transmit the buffered downlink data to the corresponding UE through the eNB.

The MME can transmit the Initial Context Setup Request message to the eNB to set up the S1-U (namely, to configure the S1 bearer) between the eNB and the S-GW. The procedure for setting up the S1-U between the eNB and the S-GW is the same as described with respect to FIG. 8 or FIG. 10; therefore, detailed descriptions of the procedure will be omitted.

Also, the MME can transmit a paging message to the eNB belonging to the tracking area to which the UE has most recently registered. The paging procedure is the same as described with respect to FIG. 11; therefore, detailed descriptions of the paging procedure will be omitted.

As in the embodiment above, as the MME commands the S-GW to buffer downlink data during a time period until the UE is expected to switch to a reachable state, the corresponding downlink data can be promptly transmitted to the UE without loss as soon as the UE is switched to a reachable state. In particular, the embodiment of FIG. 15 can be more useful than the case where the UE is going to wake up soon as the P-TAU timer is about to be expired.

FIG. 16 illustrates a method for transmitting downlink data according to one embodiment of the present invention.

With reference to FIG. 16, a network node (for example, MME) receives a Downlink Data Notification message from a different network node (for example, S-GW) S1601.

In case the network node (for example, MME) detects that the UE is in the sleep mode (for example, in the PSM or in a state where the UE is unreachable through paging in the eDRX mode), the network node (for example, MME) transmits a response message to the different network node (for example, S-GW) S1602.

At this time, the response message can include DDN suppression time and/or buffering time (or valid time).

In case the DDN suppression time is included, the MME can set up a reachable time of the UE after the sleep mode with a DDN suppression time value and transmit the reachable time to the S-GW by incorporating it into the DDN reject message. At this time, the reachable time of the UE may refer to the time period ranging from the moment the MME receives a DDN message from the S-GW or transmits a DDN reject message to the moment until the UE enters a reachable state. For example, the reachable time may correspond to the remaining P-TAU period or the remaining paging-enabled period.

Also, in case buffering time (or valid time) is included, the MME can transmit the Buffering Request message by including the buffering time (or valid time) during which the S-GW has to buffer (or maintain) the corresponding downlink data. At this time, the buffering time (or valid time) may be a time period until the UE is expected to switch from the sleep mode again to a reachable state. In other words, the buffering time (or valid time) may indicate the time period ranging from when the UE is in the sleep mode (for example, in the PSM or in a state where the UE is unreachable through paging in the eDRX mode) until the UE is expected to wake up. Therefore, the MME can request (or command) the S-GW to buffer downlink data by specifying the time period ranging from when the UE is in the sleep mode (for example, in the PSM or in a state where the UE is unreachable through paging in the eDRX mode) until the UE is expected to wake up. For example, in case the UE is unreachable due to applying the PSM, the buffering time can be calculated as the remaining P-TAU time. Or, in case the UE is unreachable due to applying the eDRX, the buffering time can be calculated as the DRX period of the UE.

As one example of a response message, the DDN reject message or the Downlink Data Notification Acknowledgement message can be used. However, the present invention is not limited to the aforementioned examples, and a message in a different format from the examples above can also be used.

FIG. 17 illustrates a method for transmitting downlink data according to one embodiment of the present invention.

With reference to FIG. 17, the network node (for example, S-GW) receives downlink data from a different network node (for example, P-GW) S1701.

The network node (for example, S-GW) transmits a Downlink Data Notification (DDN) message to a different network node (for example, MME) S1702.

The network node (for example, S-GW) receives a response message with respect to the DDN message from the different network node (for example, MME) S1703.

At this time, the response message can include DDN suppression time and/or buffering time (or valid time).

If the response message includes the DDN suppression time, the network node (for example, S-GW) may discard all of the downlink data received with respect to the corresponding UE until the DDN suppression time is expired and may not transmit the DDN message.

Also, in case the response message includes the buffering time (or valid time), the network node (for example, S-GW) can buffer (or retain) the corresponding downlink packet until the buffering time (or valid time) is expired.

In this case, the S-GW may subsequently re-transmit the DDN to the MME if the buffering time is expired; however, as the MME sets up the S1-U when the buffering time is expired (namely, the UE enters a reachable state), the S-GW can transmit the buffered downlink data to the UE through the eNB.

More specifically, in case the UE is unreachable due to applying the PSM, if TAU is triggered as the P-TAU timer is expired, the S-GW can transmit buffered downlink data to the corresponding UE through the eNB by MME's setting up the S1-U.

Or, in case the UE is unreachable due to applying the eDRX, as the MME or the eNB transmits a paging message at a paging occasion and the UE sets up the S1-U through a Network-triggered Service Request procedure, the S-GW can transmit the buffered downlink data to the corresponding UE through the eNB.

Overview of Devices to which the Present Invention can be Applied

FIG. 18 illustrates a block diagram of a communication device according to one embodiment of the present invention.

With reference to FIG. 18, a wireless communication system comprises a network node 1810 and a plurality of UEs 1820.

A network node 1810 comprises a processor 1811, memory 1812, and communication module 1813. The processor 1811 implements proposed functions, processes and/or methods proposed through FIG. 1 to FIG. 17. The processor 1811 can implement layers of wired/wireless interface protocol. The memory 1812, being connected to the processor 1811, stores various types of information for driving the processor 1811. The communication module 1813, being connected to the processor 1811, transmits and/or receives wired/wireless signals. Examples of the network node 1810 include an eNB, MME, HSS, AS, SCS, and so on. In particular, in case the network node 1810 is an eNB, the communication module 1813 can include an Radio Frequency (RF) unit for transmitting/receiving a radio signal.

The UE 1820 comprises a processor 1821, memory 1822, and communication module (or RF unit) 1823. The processor 1821 implements proposed functions, processes and/or methods proposed through FIG. 1 to FIG. 17. The processor 1821 can implement layers of wired/wireless interface protocol. The memory 1822, being connected to the processor 1821, stores various types of information for driving the processor 1821. The communication module 1823, being connected to the processor 1821, transmits and/or receives wired/wireless signals.

The memory 1812, 1822 can be installed inside or outside the processor 1811, 1821 and can be connected to the processor 1811, 1821 through various well-known means. Also, the network node 1810 (in the case of an eNB) and/or the UE 1820 can have a single antenna or multiple antennas.

The embodiments described above are a combination of constituting elements and features of the present invention in particular forms. Unless otherwise specified, each is constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function performing operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

INDUSTRIAL APPLICABILITY

This document discloses a method for transmitting downlink data in a wireless communication system with examples based on the 3GPP LTE/LTE-A system; however,

The invention claimed is:

1. A method for transmitting downlink data to a User Equipment (UE) in a wireless communication system, the method comprising:
  receiving, by a Mobile Management Entity (MME), a Downlink Data Notification message from a Serving Gateway (S-GW);
  transmitting, by the MME, a Downlink Data Notification Ack message in response to the Downlink Data Notification message to the S-GW; and
  re-receiving, by the MME, the Downlink Data Notification message from the S-GW, when a buffering time is expired,
  wherein the Downlink Data Notification Ack message includes the buffering time for the S-GW to buffer the downlink data, when the MME detects that the UE is in a Power Saving Mode (PSM) and the UE cannot be reached by a paging, and wherein the buffering time is a duration time until the UE is expected to transition from the PSM to a reachable state by performing a periodic Tracking Area Update (TAU) procedure.

2. The method of claim 1, further comprising transmitting, by the MME, an Initial Context Setup Request message to an evolved-Node B (eNB) to configure an S1 bearer.

3. The method of claim 1, further comprising transmitting, by the MME, a paging message to an evolved-Node B (eNB) belonging to a tracking area to which the UE has most recently registered.

4. A method for transmitting downlink data to a User Equipment (UE) in a wireless communication system, the method comprising:

receiving, by a Serving Gateway (S-GW), downlink data to be transmitted to the UE from a Packet Gateway (P-GW);

transmitting, by the S-GW, a Downlink Data Notification message to a Mobile Management Entity (MME);

receiving, by the S-GW, a Downlink Data Notification Ack message in response to the Downlink Data Notification message from the MIME; and re-transmitting, by the S-GW, the Downlink Data Notification message from the MME, when a buffering time is expired, wherein the Downlink Data Notification Ack message includes the buffering time for the S-GW to buffer the downlink data, when the MME detects that the UE is in a Power Saving Mode (PSM) and the UE cannot be reached by a paging, and wherein the buffering time is a duration time until the UE is expected to transition from the PSM to a reachable state by performing a periodic Tracking Area Update (TAU) procedure.

* * * * *